United States Patent [19]

Hirosawa et al.

[11] Patent Number: 4,826,898
[45] Date of Patent: May 2, 1989

[54] COLORED POLYPROPYLENE RESIN

[75] Inventors: Takumi Hirosawa, Suita; Yuzo Hirayama, Ibaragi; Keiki Sagara, Suita; Mituhiro Isomichi, Takatsuki; Junichi Kumabe, Kobe, all of Japan

[73] Assignee: Dainippon Ink and Chemicals, Inc., Tokyo, Japan

[21] Appl. No.: 174,867

[22] Filed: Mar. 29, 1988

[30] Foreign Application Priority Data

Apr. 3, 1987 [JP] Japan .................................. 62-81108

[51] Int. Cl.$^4$ ........................... C08K 5/56; C08K 5/24; C08J 3/20
[52] U.S. Cl. ...................... 524/88; 524/583
[58] Field of Search ................. 524/88, 583

[56] References Cited

U.S. PATENT DOCUMENTS

| | | | |
|---|---|---|---|
| 3,994,726 | 11/1976 | Wales | 430/131 |
| 4,002,476 | 1/1977 | Wales | 430/117 |
| 4,079,026 | 3/1978 | Mone | 524/513 |
| 4,094,839 | 6/1978 | Riegler et al. | 524/400 |
| 4,191,680 | 3/1980 | Wegmann et al. | 524/522 |
| 4,233,206 | 11/1980 | Katsura et al. | 524/431 |
| 4,425,418 | 1/1984 | Iwaki et al. | 430/115 |

FOREIGN PATENT DOCUMENTS

J33142 3/1976 Japan .
147036 8/1984 Japan .

*Primary Examiner*—Herbert J. Lilling
*Attorney, Agent, or Firm*—Sherman & Shalloway

[57] ABSTRACT

A colored polypropylene resin comprising a polypropylene resin, a carbon black pigment and a copper phthalocyanine pigment, said colored polypropylene resin further comprising 0.2 to 20 parts by weight, per 100 parts by weight of said two pigments combined, of at least one compound selected from the group consisting of (1) Compounds of the following general formula

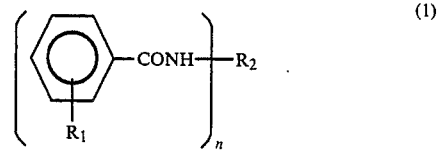

(2) Compounds of the following formula

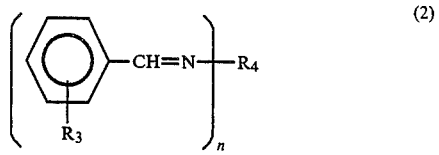

(3) Compounds of the following formula

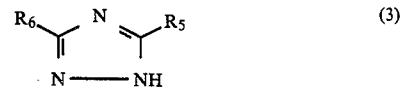

and (4) Compounds of the following formula

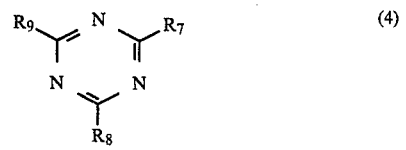

8 Claims, No Drawings

COLORED POLYPROPYLENE RESIN

This invention relates to a colored polypropylene resin which has extensive use as household articles, electrical component parts, automobile parts and other molded articles. More specifically, this invention relates to a colored polypropylene resin having excellent thermal stability in spite of containing carbon black and a copper phthalocyanine pigment.

It has long been known that polypropylene resins undergo greater thermal degradation than polyethylene resins; the addition of some types of coloring agents to the polypropylene resins will affect their thermal degradation; and such pigments as carbon black, copper phthalocyanine blue and benzidine yellow greatly accelerate degradation. In recent years, however, such degrading pigments have fully withstood normal use in polypropylene resins as a result of removing impurities during pigment production or by using an antioxidant together to prevent acceleration of degradation.

There is now a demand for bluish black to black colors in polypropylene articles. These colors differ from reddish black which is the inherent color of a carbon black pigment, and this necessitates the use of another pigment with the carbon black pigment. For this purpose, phthalocyanine pigments and bluish pigments such as ultramarine have come into use as toning pigments.

However, the combined use of a carbon black pigment and a copper phthalocyanine pigment having superior fastness characteristics again gives rise to the problem of marked thermal degradation of propylene resins, which problem has already been solved when these pigments are used singly. Moreover, this thermal degradation cannot be inhibited by antioxidants whose thermal degradation inhibiting effects on polypropylene resins have already been recognized, for example, phenolic antioxidants such as pentaerythrityl-tetrakis[3-(3,5-di-t-butyl-4-hydroxyphenyl)propionate], octadecyl-3-(3,5-di-t-butyl-4-hydroxypenyl)propionate and 2,6-di-t-butyl-4-methylphenol, thioether antioxidants such as pentaerythritol-tetrakis($\beta$-laurylthiopropionate), and phosphite antioxidants such as tris(2,4-di-t-butylphenyl)phosphite.

It is an object of this invention to prevent the phenomenon of accelerating thermal degradation which has newly occurred in a colored polypropylene resin comprising both a carbon black pigment and a copper phthalocyanine pigment.

The present inventors, as a result of investigations in order to achieve this object, have now found that certain types of compounds are effective for preventing acceleration of thermal degradation of the colored polypropylene resin.

The polypropylene resin used in this invention may be any grade of molding polypropylene generally used. It may be a copolymer of propylene with ethylene, butene and/or butadiene, or a blend of polypropylene with an elastomer.

The carbon black pigment used in this invention may be any of commercial pigment-grade carbon blacks such as furnace carbon black, channel carbon black and acetylene black.

The copper phthalocyanine pigment is a pigment comprising phthalocyanine having copper as a central metal or its derivative. Cyanine blue and cyanine green are typical examples.

The inclusion of both the carbon black pigment and the copper phthalocyanine pigment in the polypropylene resin accelerates thermal degradation. The state of acceleration, however, depends upon, for example, the proportions of the two pigments and the pigment concentration in the resin. The proportions of the pigments which markedly accelerate thermal degradation are such that the resin contains 100 parts by weight of the carbon black and 0.2 to 20 parts by weight of the copper phthalocyanine pigment. High pigment concentrations in the polypropylene resin naturally accelerate thermal degradation. The acceleration of thermal degration can be fully prevented by increasing the amounts of the compounds of the general formulae given below according to the pigment concentrations.

A group of the following compounds of general formulae (1) to (4) discovered by the present inventors are effective for preventing the acceleration of thermal degradation of the colored polypropylene resin containing both the carbon black pigment and the copper phthalocyanine pigment.

(1) Compounds of the following general formula

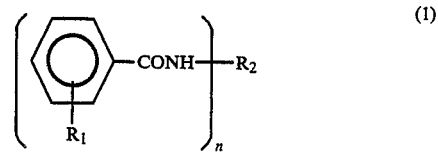

wherein n is 1 or 2; when n is 1, $R_1$ represents a hydrogen atom, —OH or —CONHR$_2$ and $R_2$ represents —NHCOR' (where R' represents an alkyl group) or

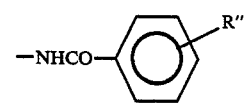

(where R'' represents a hydrogen atom or —OH), provided that when $R_1$ is —OH at a position ortho to the CONH group, $R_2$ represents —R', —NHCOR' or

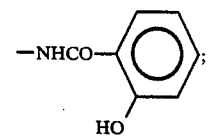

and when n is 2, $R_1$ represents a hydrogen atom or —OH and $R_2$ represents —NHCO.CONH— or —NHCO—R'''—CONH— (where R''' represents a methylene chain), provided that when $R_1$ is —OH at a position ortho to the CONH group, $R_2$ represents —R'''—, —NHCO.CONH— or —NHCO—R'''—CONH—.

(2) Compounds of the following formula

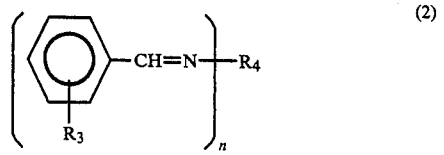

wherein n is 1 or 2; when n is 1, $R_3$ represents a hydrogen atom or —OH and $R_4$ represents —NHCOR',

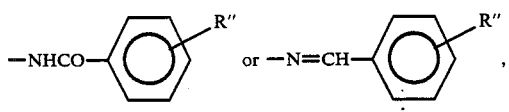

provided that when $R_3$ represents —OH at a position ortho to the CH=N group, $R_4$ represents —R', —NHCOR',

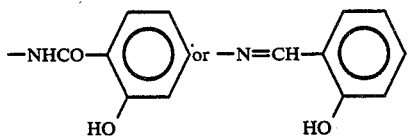

in which R' and R" are as defined above; and when n is 2, $R_3$ represents a hydrogen atom or —OH and $R_4$ represents —NHCO.CONH— or —NHCO—R'"—CONH—, provided that when $R_3$ represents —OH at a position ortho to the CH=N group, $R_4$ represents —R'"—, —NHCO.CONH— or —NHCO—R'"—CONH— in which R'" is as defined above.

(3) Compounds of the following formula

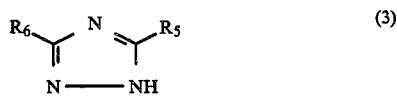

wherein either one of $R_5$ and $R_6$ represents —$OQ_1$, —$SQ_1$, —$NQ_1Q_2$, —$CH_2OH$, —$CH_2SH$ or —$CH_2NQ_1Q_2$ (in which $Q_1$ and $Q_2$ represent a hydrogen atom or an alkyl group),

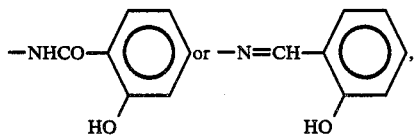

and the other represents a hydrogen atom or said substituents.

(4) Compounds of the following formula

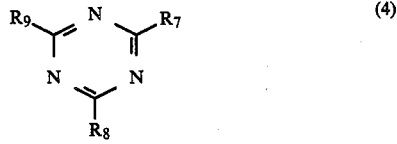

wherein at least one of $R_7$, $R_8$ and $R_9$ represents —$OQ_1$, —$SQ_1$, —$NQ_1Q_2$, —$CH_2OH$, —$CH_2SH$ or —$CH_2NQ_1Q_2$ (in which $Q_1$ and $Q_2$ are as defined above),

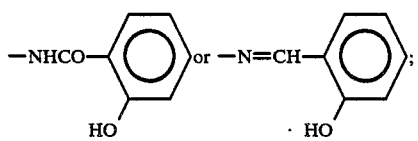

and the others represent a hydrogen atom or said substituents.

These compounds may be used singly or in combination.

A preferred group of compounds used in this invention include compounds of general formula (1) wherein $R_1$ is —OH ortho to the CONH group (when n is 1 or 2) or —$CONHR_2$ (when n is 1); compounds of general formula (2) wherein $R_3$ is —OH ortho to the CH=N group (when n is 1 and 2); compounds of general formula (3) wherein at least one of $R_5$ and $R_6$ represents

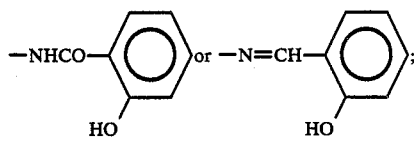

and compounds of general formula (4) wherein all $R_7$, $R_8$ and $R_9$ are the aforesaid substituents. Specific preferred examples are 1,10-decanedicarboxylic acid bis(salicyloyl hydrazide), N,N'-disalicylidene-1,2-propanediamine, 3-(N-salicyloyl)amino-1,2,4-triazole, 2-dibutylamino-4,6-dimercapto-s-triazine and 2,4,6-trimercapto-s-triazine. The use of 3-(N-salicyloyl)amino-1,2,4-triazole is especially preferred because it is very effective for inhibition of thermal degradation in polypropylene resins, and is easily available commercially and easy to handle.

Thermal degradation of the colored polypropylene can be sufficiently inhibited by adding at least one of the compounds of formulae (1) to (4) (to be referred to as the "thermal degradation inhibitor" hereinafter) in an amount of 0.2 to 20 parts by weight, preferably 2 to 10 parts by weight, per 100 parts by weight of the carbon black pigment and the copper phthalocyanine pigment combined. If its amount is less than 0.2 part by weight, the effect of thermal degradation inhibition is small. If it exceeds 20 parts by weight, a trouble may occur in dispersing the thermal degradation inhibitor in the resin.

Since the mere presence of the thermal degradation inhibitor in the polypropylene resin together with the two pigments can inhibit the acceleration of thermal degradation, there is no particular limitation on the means of mixing and dispersing the pigments and the thermal degradation inhibitor with and in the polypropylene resin. To disperse the pigments uniformly, however, the widely practiced method of coloring a polypropylene resin using coloring agents is a preferred means. The dry color method and master batch method are typical examples of such a coloring method. According to the dry color method, the two pigments, the thermal degradation inhibitor and a metal soap such as a stearate of a metal (e.g., Zn, Al, Mg or Ca) are mixed in a Henschel mixer or the like to prepare a dry color. One hundred parts by weight of the dry color contains 5 to 80 parts by weight of the pigments and the thermal degradation inhibitor. In the case of the master batch method, the two pigments, the thermal degradation inhibitor and the polypropylene resin as a carrier resin and if required, a dispersing agent such as a polyethylene wax, a fatty acid ester-type wax or a metal soap are mixed, and then the mixture is melt-kneaded with the polypropylene resin at a temperature above the softening point of the polypropylene resin (e.g., 200° to 240° C.) The kneaded mixture is then molded into pellets by, for example, a pelletizer to prepare a master batch having a pigment concentration of about 10 to 50%.

The resulting dry color or master batch is mixed with polypropylene resin for dilution, and molded, for example, by injection molding. As a result, a colored polypropylene article of good quality which does not undergo thermal degradation can be obtained.

It should be understood that the colored polypropylene resin of this invention may contain an organic or inorganic pigment or an extended pigment in addition to the carbon black pigment and the copper phthalocyanine pigment, and further may include various additives such as fillers, ultraviolet absorbers and antioxidants.

Articles having excellent thermal stability can be produced from the colored polypropylene resin of this invention because its thermal degradation is inhibited in spite of containing both the carbon black pigment and the copper phthalocyanine pigment.

The following Examples and Comparative Examples illustrate the present invention more specifically. All parts in these examples are by weight.

EXAMPLES 1-7 AND COMPARATIVE EXAMPLES 1-8

In each run, the materials were mixed by a Henschel mixer in accordance with the recipe shown in Table 1. The mixture was melt-kneaded in an extruder heated at 200° C. to obtain a resin coloring agent (master batch) in pellet form. One part of the resulting coloring agent was mixed with 30 parts of a polypropylene resin (injection-molding grade) as a diluting resin. The mixture was injection-molded to form a colored polypropylene plate having a length of 90 mm, a width of 50 mm and a thickness of 3 mm. The plate was maintained at 150° C. in an oven, and the time elapsed (days) until cracking occurred on its surface was measured and made a measure of thermal resistance.

The results are summarized in Table 1.

EXAMPLES 8-41

Example 1 was repeated except that each of the compounds shown in Tables 2 to 5 was used instead of the thermal degradation inhibitor (A). In all runs, the time elapsed until cracking occurred on the surface of the colored polypropylene plate was at least 18 days.

TABLE 2

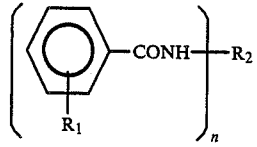

| Example | n | $R_1$ | $R_2$ |
|---|---|---|---|
| 8 | 1 | —OH(ortho) | —$(CH_2)_3CH_3$ |
| 9 | 1 | —OH(ortho) | —$(CH_2)_9CH_3$ |
| 10 | 1 | —OH(ortho) | —$NHCOCH_3$ |
| 11 | 1 | —OH(ortho) | 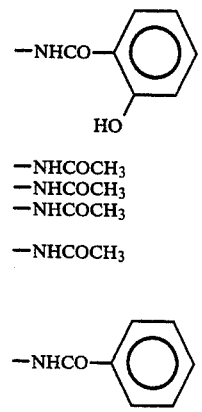 |
| 12 | 1 | —OH(para) | —$NHCOCH_3$ |
| 13 | 1 | —H | —$NHCOCH_3$ |
| 14 | 1 | —CONHNHCOCH$_3$ (ortho) | —$NHCOCH_3$ |
| 15 | 1 | —CONHNHCOCH$_3$ (meta) | —$NHCOCH_3$ |
| 16 | 1 | —H | —NHCO-⌬ |

TABLE 1

| | Example | | | | | | | Comparative Example | | | | | | | |
|---|---|---|---|---|---|---|---|---|---|---|---|---|---|---|---|
| | 1 | 2 | 3 | 4 | 5 | 6 | 7 | 1 | 2 | 3 | 4 | 5 | 6 | 7 | 8 |
| Recipe (parts by weight) | | | | | | | | | | | | | | | |
| Polypropylene (*1) | 30 | 30 | 30 | 30 | 30 | 30 | 30 | 30 | 30 | 30 | 30 | 30 | 30 | 30 | 30 |
| Polyethylene wax (*2) | 40 | 40 | 40 | 40 | 40 | 40 | 40 | 40 | 40 | 40 | 40 | 40 | 40 | 40 | 40 |
| Carbon black (*3) | 28.5 | 28.5 | 28.5 | 28.5 | 28.5 | 21 | 29.7 | 28.5 | 28.5 | 28.5 | 28.5 | 24.5 | 28.9 | 30 | — |
| Copper phthalocyanine blue (*4) | 0.5 | 0.5 | 0.5 | 0.5 | — | 4 | 0.1 | 0.5 | 0.5 | 0.5 | — | 4.5 | 0.1 | — | 30 |
| Copper phthalocyanine green (*5) | — | — | — | — | 0.5 | — | — | — | — | 0.5 | — | — | — | — | — |
| Thermal degradation inhibitor (A) (*6) | 1 | — | — | — | 1 | 5 | 0.2 | — | — | — | — | — | — | — | — |
| Thermal degradation inhibitor (B) (*7) | — | 1 | — | — | — | — | — | — | — | — | — | — | — | — | — |
| Thermal degradation inhibitor (C) (*8) | — | — | 1 | — | — | — | — | — | — | — | — | — | — | — | — |
| Thermal degradation inhibitor (D) (*9) | — | — | — | 1 | — | — | — | — | — | — | — | — | — | — | — |
| Phenolic antioxidant (*10) | — | — | — | — | — | — | — | 1 | — | — | 1 | 1 | 1 | — | — |
| Phosphite antioxidant (*11) | — | — | — | — | — | — | — | — | 1 | — | — | — | — | — | — |
| Thioether antioxidant (*12) | — | — | — | — | — | — | — | — | — | 1 | — | — | — | — | — |
| Heat resistance (days elapsed until cracking occurred in an oven at 150° C.) | 21 | 20 | 22 | 19 | 22 | 20 | 22 | 9 | 8 | 8 | 12 | 7 | 14 | 18 | 20 |

Note:
(*1): "X-440", a product of Mitsui Petrochemical Industries, Ltd.
(*2): "SUNWAX 161P", a product of Sanyo Chemical Industry Co., Ltd.
(*3): Furnace carbon black, a product of Mitsubishi Chemical Industry Co., Ltd.
(*4) and (*5): Produced by Dainippon Ink and Chemicals Inc.
(*6): 1,10-decanedicarboxylic acid bis(salicyloyl-hydrazide)
(*7): N,N'—disalicylidene-1,2-propanediamide
(*8): 3-(N—salicyloyl)amino-1,2,4-trizole
(*9): 2-dibutylamino-4,6-dimercapto-s-triazine
(*10): pentaerythrityl-tetrakis[3-(3,5-di-t-butyl-4-hydroxyphenyl)propionate]
(*11): tris(2,4-di-t-butylphenyl)phosphite
(*12): pentaerythritol-tetrakis($\beta$-lauryl propionate)

TABLE 2-continued $$\left( \underset{R_1}{\underset{|}{\bigcirc}} -CONH \right)_n R_2 \quad (1)$$

| Example | n | $R_1$ | $R_2$ |
|---------|---|-------|-------|
| 17 | 2 | —OH(ortho) | —NHCO.CONH— |
| 18 | 2 | —OH(ortho) | —(CH$_2$)$_4$— |
| 19 | 2 | —OH(para) | —NHCO.CONH— |

TABLE 3

$$\left( \underset{R_3}{\underset{|}{\bigcirc}} -CH=N \right)_n R_4 \quad (2)$$

| Example | n | $R_3$ | $R_4$ |
|---------|---|-------|-------|
| 20 | 1 | —OH(ortho) | —(CH$_2$)$_3$CH$_3$ |
| 21 | 1 | —OH(ortho) | —(CH$_2$)$_9$CH$_3$ |
| 22 | 1 | —OH(ortho) | —NHCOCH$_3$ |
| 23 | 1 | —OH(ortho) | —NHCO—(2-hydroxyphenyl) |
| 24 | 1 | —H | —NHCOCH$_3$ |
| 25 | 1 | —H | —NHCO—(2-hydroxyphenyl) |
| 26 | 1 | —H | —N=CH—(phenyl) |
| 27 | 2 | —OH(ortho) | —NHCO.CONH— |
| 28 | 2 | —OH(ortho) | —NHCO(CH$_2$)$_8$CONH— |
| 29 | 2 | —OH(ortho) | —(CH$_2$)$_4$— |
| 30 | 2 | —OH(para) | —NHCO(CH$_2$)$_8$CONH— |

TABLE 4

$$\underset{N \longrightarrow NH}{R_6 \diagdown \underset{\|}{N} \diagup R_5} \quad (3)$$

| Example | $R_5$ | $R_6$ |
|---------|-------|-------|
| 31 | —H | —N=CH—(2-hydroxyphenyl) |
| 32 | —H | —OH |
| 33 | —H | —OCH$_2$CH$_3$ |
| 34 | —H | —NH$_2$ |
| 35 | —H | —SH |
| 36 | —OH | —OH |
| 37 | —NH$_2$ | —NH$_2$ |
| 38 | —H | —CH$_2$OH |

TABLE 5

$$\underset{R_8}{R_9 \diagdown \underset{N \diagup \quad \diagdown N}{N \diagup \quad \diagdown N} \diagup R_7} \quad (4)$$

| Example | $R_7$ | $R_8$ | $R_9$ |
|---------|-------|-------|-------|
| 39 | —OH | —OH | —OH |
| 40 | —SH | —SH | —SH |
| 41 | —NHCO—(2-hydroxyphenyl) | —SH | —SH |

EXAMPLES 42–44

Example 1 was repeated except that 1 part by weight of each of the thermal degradation inhibitor mixture shown in Table 6 was used instead of 1 part of the thermal degradation inhibitor (A) shown in Table 1. In all runs, the time elapsed until cracking occurred on the surface of the colored polypropylene plate was at least 18 days.

TABLE 6

| Example | Thermal degradation inhibitor mixture | |
|---------|------|------|
| 42 | (A) | 0.5 part |
|    | (B) | 0.5 part |
| 43 | (C) | 0.5 part |
|    | (D) | 0.5 part |
| 44 | (A) | 0.25 part |
|    | (B) | 0.25 part |
|    | (C) | 0.25 part |
|    | (D) | 0.25 part |

What we claim is:

1. A colored polypropylene resin comprising a polypropylene resin, a carbon black pigment and a copper phthalocyanine pigment, said colored polypropylene resin further comprising 0.2 to 20 parts by weight, per 100 parts by weight of said two pigments combined, of at least one compound selected from the group consisting of (1) compounds of the following general formula $$\left( \underset{R_1}{\underset{|}{\bigcirc}} -CONH \right)_n R_2 \quad (1)$$

wherein n is 1 or 2; when n is 1, $R_1$ represents a hydrogen atom, —OH or —CONHR$_2$ and $R_2$ represents —NHCOR' (where R' represents an alkyl group) or

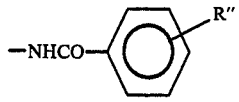

(where R" represents a hydrogen atom or —OH), provided that when $R_1$ is —OH at a position ortho to the CONH group, $R_2$ represents —R', —NHCOR' or

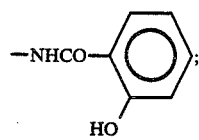

and when n is 2, $R_1$ represents a hydrogen atom or —OH and $R_2$ represents —NHCO.CONH— or —NHCO—R'''—CONH— (where R''' represents a methylene chain), provided that when $R_1$ is —OH at a position ortho to the CONH group, $R_2$ represents —R'''—, —NHCO.CONH— or —NHCO—R'''—CONH—, (2) compounds of the following formula

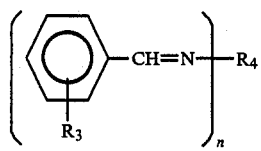

wherein n is 1 or 2; when n is 1, $R_3$ represents a hydrogen atom or —OH and $R_4$ represents —NHCOR',

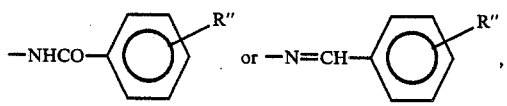

provided that when $R_3$ represents —OH at a position ortho to the CH=N group, $R_4$ represents —R', —NHCOR',

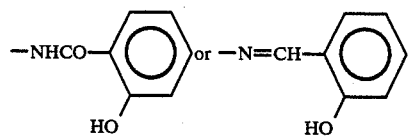

in which R' and R" are as defined above; and when n is 2, $R_3$ represents a hydrogen atom or —OH and $R_4$ represents —NHCO.CONH— or —NHCO—R'''—CONH—, provided that when $R_3$ represents —OH at a position ortho to the CH=N group, $R_4$ represents —R'''—, —NHCO.CONH— or —NHCO—R'''—CONH— in which R''' is as defined above, (3) Compounds of the following formula

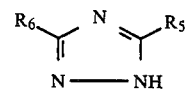

wherein either one of $R_5$ and $R_6$ represents —OQ$_1$, —SQ$_1$, —NQ$_1$Q$_2$, —CH$_2$OH, —CH$_2$SH or —CH$_2$NQ$_1$Q$_2$ (in which Q$_1$ and Q$_2$ represent a hydrogen atom or an alkyl group),

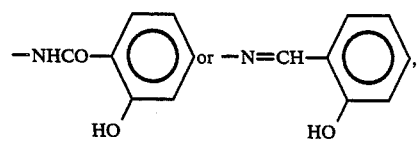

and the other represents a hydrogen atom or said substituents, and (4) Compounds of the following formula

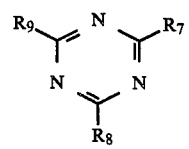

wherein at least one of $R_7$, $R_8$ and $R_9$ represents —OQ$_1$, —SQ$_1$, —NQ$_1$Q$_2$, —CH$_2$OH, —CH$_2$SH or —CH$_2$NQ$_1$Q$_2$ (in which Q$_1$ and Q$_2$ are as defined above),

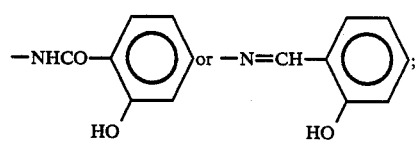

and the others represent a hydrogen atom or said substituents.

2. The colored polypropylene resin of claim 1 which is produced by mixing said two pigments with 0.2 to 20 parts by weight, per 100 parts by weight of the two pigments combined, of at least one of the compounds of general formulae (1) to (4) to prepare a coloring agent, and then coloring the polypropylene resin with the coloring agent.

3. The colored polypropylene resin of claim 1 or 2 wherein the compound of general formula (1), (2), (3) or (4) is 1,10-decanedicarboxylic acid bis(salicyloyl hydrazide), N,N'-disalicylidene-1,2-propanediamine, 3-(N-salicyloyl)amino-1,2,4-triazole, 2-dibutylamino-4,6-dimercapto-s-triazine or 2,4,6-trimercapto-s-triazine.

4. The colored polypropylene resin of claim 1 or 2 wherein at least one said compound selected from compounds of general formulae (1) to (4) is included in an amount of 2 to 10 parts by weight per 100 parts by weight of the two pigments combined.

5. The colored polypropylene resin of claim 1 or 2 wherein the copper phthalocyanine pigment is included in an amount of 0.2 to 20 parts by weight per 100 parts by weight of the carbon black pigment.

6. The colored polypropylene resin of claim 3 wherein the amount of said at least one compound is from 2 to 20 parts by weight per 100 parts by weight of the two pigments combined.

7. The colored polypropylene resin of claim 6 wherein the copper phthalocyanine pigment is included in an amount of 0.2 to 20 parts by weight per 100 parts by weight of the carbon black pigment.

8. The colored polypropylene resin of claim 3 wherein the copper phthalocyanine pigment is included in an amount of 0.2 to 20 parts by weight per 100 parts by weight of the carbon black pigment.

* * * * *